United States Patent [19]

Gardner et al.

[11] Patent Number: 5,596,050
[45] Date of Patent: Jan. 21, 1997

[54] HIGH MODULUS EPOXY RESIN SYSTEMS

[75] Inventors: Hugh C. Gardner, Somerville; Michael J. Michno, Jr., Bridgewater; Robert J. Cotter, Bernardsville, all of N.J.

[73] Assignee: Amoco Corporation, Chicago, Ill.

[21] Appl. No.: 583,358

[22] Filed: Mar. 1, 1984

[51] Int. Cl.$^6$ .................................................. C08L 63/00
[52] U.S. Cl. .......................... 525/524; 525/525; 525/526
[58] Field of Search ....................... 528/87, 99; 525/524, 525/525, 526

[56] References Cited

U.S. PATENT DOCUMENTS

| 2,935,488 | 5/1960 | Phillips et al. | 528/87 |
|---|---|---|---|
| 3,398,102 | 8/1968 | Soldatos et al. | 260/2 |
| 3,547,881 | 12/1970 | Mueller et al. | 528/87 |
| 4,340,716 | 7/1982 | Hata et al. | 528/87 |
| 4,370,382 | 1/1983 | Salersky | 528/87 |
| 4,665,150 | 5/1987 | Tesch et al. | 528/99 |

FOREIGN PATENT DOCUMENTS

82/04256  12/1982  WIPO ........................ 528/87

*Primary Examiner*—Charles T. Jordan
*Assistant Examiner*—John R. Hardee
*Attorney, Agent, or Firm*—Richard J. Schlott; Stephen L. Hensley

[57] ABSTRACT

Described herein are resinous compositions comprising a particular cycloaliphatic epoxy resin and the adduct of these epoxy resins with an aromatic active hydrogen-containing compound. These compositions afford unreinforced castings with higher heat deflection temperatures, faster cure rates, and reduced water uptake than similar compositions containing epoxy adducts made from aliphatic polyols.

10 Claims, No Drawings

HIGH MODULUS EPOXY RESIN SYSTEMS

BACKGROUND OF THE INVENTION

Advanced composites are high strength, high modulus materials which are finding increasing use as structural components in aircraft, automotive, and sporting goods applications. Typically they comprise structural fibers such as carbon fibers in the form of woven cloth or continuous filaments embedded in a thermosetting resin matrix.

Composite properties depend on both the matrix resin and the reinforcement. In unidirectional carbon fiber composites, important mechanical properties include longitudinal tensile strength and modulus, transverse tensile strength and modulus, and longitudinal compressive strength. The matrix affects all of these properties, but has the greatest effect on compressive strength and transverse tensile properties. High composite compressive strengths and transverse tensile moduli require that the matrix have a high modulus.

State-of-the-art epoxy matrix resin systems in advanced composites are typically based on N,N,N',N'-tetraglycidyl 4,4'-diaminodiphenyl methane and 4,4'-diaminodiphenyl sulfone. These resins produce unreinforced castings which have tensile strengths of about 8,000 psi and tensile moduli of 500,000 to 550,000 psi. Unidirectional composites containing 60 volume fraction carbon fiber made with these matrix resins typically have transverse tensile strengths of 5,000 to 7,000 psi and transverse tensile moduli of 1.0 to 1.4 million psi. Higher transverse properties are particularly desirable for applications such as pressure vessels. Improved compressive properties are desirable for structures subjected to high compressive loads such as sucker rods for oil wells.

Epoxy resin systems affording higher matrix properties than state-of-the-art formulations are known. For example, U.S. Pat. No. 3,398,102 discloses tacky, curable polymers formed by reacting bis(2,3-epoxycyclopentyl)ether with aliphatic polyols. Castings made by curing these compositions with aromatic amines have some of the highest tensile strengths (16 to 18,000 psi) and tensile moduli (700 to 850,000 psi) of any thermosetting material. However, these castings typically have relatively low heat deflection temperatures and absorb large amounts of moisture. In addition, they cure relatively slowly, limiting their utility in certain composite fabrication processes such as filament winding. Thus, there is a need for matrix resins which afford high tensile strengths and moduli in combination with improved heat deflection temperatures, faster cure rates, and a reduced tendency to absorb moisture.

It has now been found that compositions containing a select class of cycloaliphatic epoxies in combination with reaction products of aromatic active hydrogen containing compounds with these same cycloaliphatic epoxies afford unreinforced castings with higher heat deflection temperatures, faster cure rates and lower water uptake than similar compositions containing epoxy adducts made from aliphatic polyols.

Further, it has been found that a particular combination of a cycloaliphatic epoxy resin with the reaction product of such cycloaliphatic epoxy resin and an aromatic active hydrogen containing compound can be used to produce unreinforced castings which have higher tensile modulii than a casting produced using the cycloaliphatic epoxide alone.

THE INVENTION

This invention is directed to a resinous composition comprising:

(a) a cycloaliphatic epoxy resin selected from bis(2,3-epoxycyclopentyl) ether, 4-(1,2-epoxyethyl)-1,2-epoxycyclohexane, 3,4-epoxycyclohexylmethyl 3,4-epoxycyclohexane carboxylate, 2-(3,4-epoxycyclohexyl-5,5-spiro-3,4-epoxy)cyclohexane meta-dioxane, bis(3,4-epoxycyclohexyl) ether, 1,4-cyclohexadiene diepoxide, a diepoxide of vinyl cyclopentenyl ether, a diepoxide of allyl cyclopentenyl ether, or mixtures thereof, and (b) the adduct of an epoxy resin of (a) with an aromatic active hydrogen containing compound selected from one or more of the following:

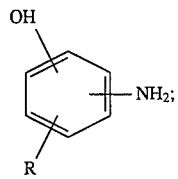

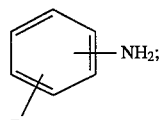

wherein R is H or lower alkyl, p is an integer of 2 or 3, or

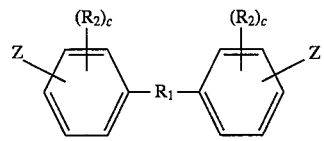

wherein $R_1$ is a direct bond, O, $SO_2$, S, CO, SO, alkylidene of 1 to 6 carbon atoms, $R_2$ is independently hydrogen, halogen, lower alkyl, c is an integer of 0 to 4, Z is OH or $NHR_3$ and $R_3$ is hydrogen or lower alkyl of 1 to 4 carbon atoms, and wherein the total epoxy equivalent weight of the composition is between about 60 and about 250 grams/mole.

The composition may be cured with an epoxy curing agent. Optionally, the composition may contain a thermoplastic polymer and/or a structural fiber.

The preferred epoxy resins are bis(2,3-epoxycyclopentyl)ether, 4-(1,2-epoxyethyl)-1,2-epoxycyclohexane (also identified as vinyl cyclohexene diepoxide), 3,4-epoxycyclohexylmethyl 3,4-epoxycyclohexane carboxylate, 1,4-cyclohexadiene diepoxide and 2-(3,4-epoxycyclohexyl-5,5-spiro-3,4-epoxy)cyclohexane meta-dioxane.

Of course, it is known that several of the epoxy resins of this invention exist in isomeric forms.

The compositions of this invention are cured with conventional epoxy curing agents such as aromatic diamines, aliphatic amines, anhydrides or dicyandiamide. Examples of aromatic diamines include 4,4'-diaminodiphenyl ether, 4,4'-diaminodiphenyl methane, 3,3'-diaminodiphenyl methane, 4,4'-diaminodiphenyl sulfone, 3,3'-diaminodiphenyl sulfone, 3,3'-diaminobenzophenone, diethyltoluenediamine, m-phenylenediamine, p-phenylenediamine, 4,4'-diaminodiphenyl propane, 4,4'-diaminodiphenyl sulfide, 1,4-bis(p-aminophenoxy)benzene, 1,4-bis(m-aminophenoxy)benzene, 1,3-bis-(m-aminophenoxy)benzene, 1,3-bis(p-aminophenoxy)benzene, 4,4'-bis(3-aminophenoxy)diphenyl sulfone, trimethylene glycol di-4- aminobenzoate, and 2,2-bis(4-aminophenoxyphenyl)propane; aliphatic amines include p-methane diamine and 1,6-hexanotiamine; anhydrides include tetrahydrophthalic anhydride, hexahydrophthalic anhydride, maleic anhydride, methyl nadic anhydride and benzophenone dianhydride.

The compositions of this invention are resinous, that is, they are liquids, semi-solids, or supercooled liquids at room temperature (25° C.). Their viscosities at 25° C. range between 5 and 5,000,000 centipoise.

Coepoxy resins which may be used in the composition of this invention contain two or more epoxy groups having the following formula:

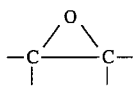

The epoxy groups can be terminal epoxy groups or internal epoxy groups. The epoxides are of two general types: polyglycidyl compounds or products derived from epoxidation of dienes or polyenes. Polyglycidyl compounds contain a plurality of 1,2-epoxide groups derived from the reaction of a polyfunctional active hydrogen containing compound with an excess of an epihalohydrin under basic conditions. When the active hydrogen compound is a polyhydric alcohol or phenol, the resulting epoxide resin contains glycidyl ether groups. A preferred group of polyglycidyl compounds are made via condensation reactions with 2,2-bis(4-hydroxyphenyl)propane, also known as bisphenol A, and have structures such as II:

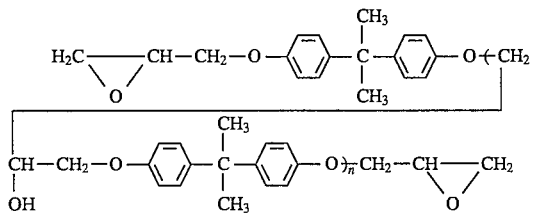

where n has a value from about 0 to about 15. These epoxides are bisphenol-A epoxy resins. They are available commercially under the trade names such as "EPON 828," "EPON 1001", and "EPON 1009" from Shell Chemical Co., and as "DER 331", and "DER 334" from Dow Chemical Co. The most preferred bisphenol A epoxy resins have an "n" value between 0 and 10.

Polyepoxides which are polyglycidyl ethers of 4,4'-dihydroxydiphenyl methane, 4,4'-dihydroxydiphenyl sulfone, 4,4'-biphenol, 4,4'-dihydroxydiphenyl sulfide, phenolphthalein, resorcinol, 4,2'-biphenol, or tris(4-hydroxyphenyl) methane and the like, are useful in this invention. In addition, EPON 1031 (a tetraglycidyl derivative of 1,1,2,2-tetrakis(hydroxyphenyl)ethane from Shell Chemical Company), and Apogen 101, (a methylolated bisphenol A resin from Schaefer Chemical Co.) may also be used. Halogenated polyglycidyl compounds such as D.E.R. 580 (a brominated bisphenol A epoxy resin from Dow Chemical Company) are also useful. Other suitable epoxy resins include polyepoxides prepared from polyols such as pentaerythritol, glycerol, butanediol or trimethylolpropane and an epihalohydrin.

Polyglycidyl derivatives of phenol-formaldehyde novolaks such as III where d=0.1 to 8 and cresol-formaldehyde novolaks such as IV where d=0.1 to 8 are also useable.

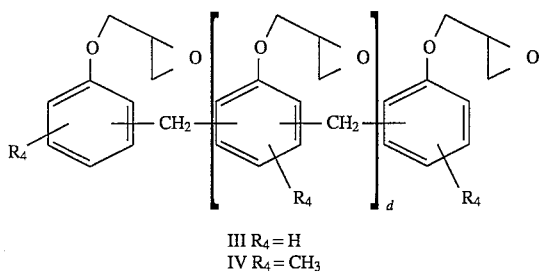

III $R_4 = H$
IV $R_4 = CH_3$

The former are commercially available as D.E.N 431, D.E.N. 438, and D.E.N. 485 from Dow Chemical Company. The latter are available as, for example, ECN 1235, ECN 1273, and ECN 1299 (obtained from Ciba-Geigy Corporation, Ardsley, N.Y.). Other epoxidized novolaks such as SU-8 (obtained from Celanese Polymer Specialties Company, Louisville, Ky.) are also suitable.

Other polyfunctional active hydrogen compounds besides phenols and alcohols may be used to prepare the polyglycidyl adducts of this invention. They include amines, aminoalcohols and polycarboxylic acids.

Adducts derived from amines include N,N-diglycidyl aniline, N,N-diglycidyl toluidine, N,N,N',N'-tetraglycidylxylylene diamine, (i.e., V) N,N,N',N'-tetraglycidyl-bis (methylamino) cyclohexane (i.e. VI), N,N,N',N'-tetraglycidyl4,4'-diaminodiphenyl methane, (i.e. VII) N,N,N',N'-tetraglycidyl-3,3'-diaminodiphenyl sulfone, and N,N'-dimethyl-N,N'-diglycidyl 4,4'-diaminodiphenyl methane. Commercially available resins of this type include Glyamine 135 and Glyamine 125 (obtained from F.I.C. Corporation, San Francisco, Calif.), Araldite MY-720 (obtained from Ciba Geigy Corporation, Ardsley, N.Y.) and PGA-X and PGA-C (obtained from The Sherwin-Williams Co., Chicago, Ill.).

V

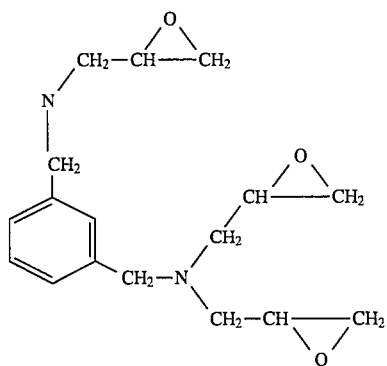

VI

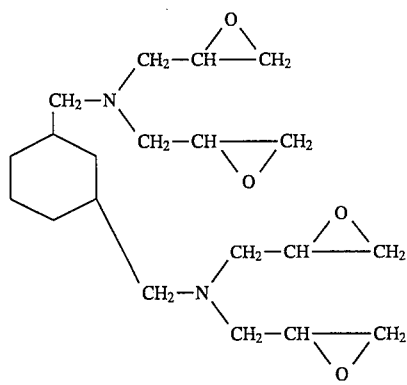

VII

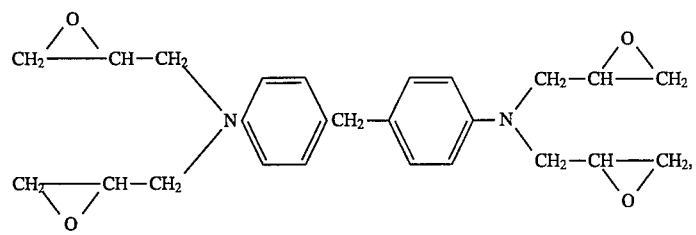

Suitable polyglycidyl adducts derived from aminoalcohols include O,N,N-triglycidyl-4-aminophenol, available as Araldite 0500 or Araldite 0510 (obtained from Ciba Geigy Corporation) and O,N,N-triglycidyl-3-aminophenol (available as Glyamine 115 from F.I.C. Corporation).

Also suitable for use herein are the glycidyl esters of carboxylic acids. Such glycidyl esters include, for example, diglycidyl phthalate, diglycidyl terephthalate, diglycidyl isophthalate, and diglycidyl adipate. There may also be used polyepoxides such as triglycidyl cyanurates and isocyanurates, N,N-diglycidyl oxamides, N,N'-diglycidyl derivatives of hydantoins such as "XB 2793" (obtained from Ciba Geigy Corporation), diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methyl methacrylate-glycidyl acrylate and 62.5:24:13.5 methyl methacrylate:ethyl acrylate:glycidyl methacrylate.

Silicone resins containing epoxy functionality, e.g., 2,4,6,8,10-pentakis [3-(2,3-epoxypropoxy)propyl]-2,4,6,8,10-pentamethylcy-clopentasiloxane and the diglycidyl ether of 1,3-bis-(3-hydroxypropyl)tetramethyldisiloxane) are also useable.

The second group of coepoxy resins is prepared by epoxidation of dienes or polyenes. Resins of this type include diglycidyl ether, VIII,

VIII

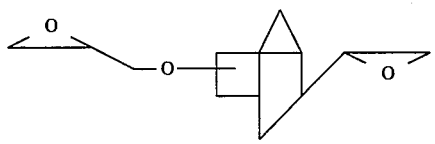

IX reaction products of bis(2,3-epoxycyclopentyl) ether with ethylene glycol which are described in U.S. Pat. No. 3,398,102, 5(6)-glycidyl-2-(1,2-epoxyethyl)bicyclo[2.2.1] heptane, IX, and dicyclopentadiene diepoxide. Commercial examples of these coepoxides include bis(3,4-epoxycyclohexylmethyl) adipate, e.g., "ERL-4299" (obtained from Union Carbide Corp.), dipentene dioxide, e.g., "ERL-4269" (obtained from Union Carbide Corp.) and epoxidized polybutadiene, e.g., "Oxiron 2001" (obtained from FMC Corp.)

Other suitable cycloaliphatic coepoxides include those described in U.S. Pat. Nos. 2,750,395; 2,890,194; and 3,318,822 which are incorporated herein by reference, and the following:

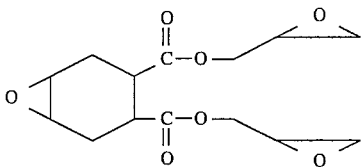

Other suitable coepoxides include:

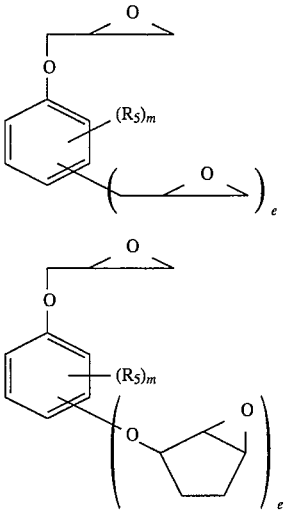

where e is 1 to 4, m is (5-e), and $R_5$ is H, halogen, or $C_1$ to $C_4$ alkyl.

Reactive diluents containing one epoxide group such as t-butylphenyl glycidyl ether, may also be used. The reactive diluent may comprise up to 25 percent by weight of the epoxide component.

The preferred coepoxy resins are bisphenol A epoxy resins of formula II where n is between 0 and 5, epoxidized novolak resins of formula III and IV where d is between 0 and 3, N,N,N',N'-tetraglycidyl xylylenediamine, and N,N,N',N'-tetraglycidyl 4,4'-diaminodiphenyl methane.

Up to 30 percent by weight of the composition of this invention may be a coepoxide.

The compositions of this invention may optionally contain a thermoplastic polymer. These materials have beneficial effects on the viscosity and film strength characteristics of the epoxy/hardener mixture (i.e., components a and b plus the hardener).

The thermoplastic polymers used in this invention include polyarylethers of formula X which are described in U.S. Pat. Nos. 4,108,837 and 4,175,175,

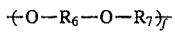   X wherein $R_6$ is a residuum of a dihydric phenol such as bisphenol A, hydroquinone, resorcinol, 4,4-biphenol, 4,4'-dihydroxydiphenyl sulfone, 4,4'-dihydroxy-3,3',5,5'-tetramethyldiphenyl sulfide, 4,4'-dihydroxy-3,3',5,5'-tetramethyldiphenyl sulfone and the like. $R_7$ is a residuum of a benzenoid compound susceptible to nucleophilic aromatic substitution reactions such as 4,4'-dichlorodiphenyl sulfone, 4,4'-difluorobenzophenone, and the like. The average value of f is from about 8 to about 120.

These polymers may have terminal groups which react with epoxy resins, such as hydroxyl or carboxyl, or terminal groups which do not react.

Other suitable polyarylethers are described in U.S. Pat. No. 3,332,209.

Also suitable are polyhydroxyethers of formula XI.

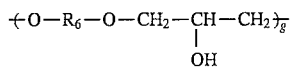   XI where $R_6$ has the same meaning as for Formula X and the average value of g is between about 8 and about 300; and polycarbonates such as those based on bisphenol A, tetramethyl bisphenol A, 4,4'-dihydroxydiphenyl sulfone, 4,4'-dihydroxy-3,3',5,5'-tetramethyldiphenyl sulfone, hydroquinone, resorcinol, 4,4'-dihydroxy-3,3',5,5'-tetramethyldiphenyl sulfide, 4,4'biphenol, 4,4'-dihydroxydiphenyl sulfide, phenolphthalein, 2,2,4,4-tetramethyl-1,3-cyclobutane diol, and the like. Other suitable thermoplastics include poly (ε-caprolactone); polybutadiene; polybutadiene/acrylonitrile copolymers, including those optionally containing amine, carboxyl, hydroxy, or -SH groups; polyesters, such as poly(butylene terephthalate); poly(ethylene terephthalate); polyetherimides such as the Ultem resins (obtained from the General Electric Company); acrylonitrile/butadiene/styrene terpolymers, polyamides such as nylon 6, nylon 6,6, nylon 6,12, and Trogamid T (obtained from Dynamit Nobel Corporation); poly(amide imides) such as Torlon poly(amide imide) (obtained from Amoco Chemical Corporation, Napierville, Ill.); polyolefins, polyethylene oxide; poly(butyl methacrylate); impact-modified polystyrene; sulfonated polyethylene; polyarylates such as those derived from bisphenol A and isophthalic and terephthalic acid; poly(2,6- dimethyl phenylene oxide); polyvinyl chloride and its copolymers; polyacetals; polyphenylene sulfide and the like.

The composition may additionally contain an accelerator to increase the rate of cure. Accelerators which may be used herein include Lewis acid:amine complexes such as $BF_3$.monoethylamine, $BF_3$.piperdine, $BF_3$.2-methylimidazole; amines, such as imidazole and its derivatives such as 4-ethyl-2-methylimidazole, 1-methylimidazole, and 2-methylimidazole; N,N-dimethylbenzylamine; acid salts of tertiary amines, such as the p-toluene sulfonic acid:imidazole complex, salts of trifluoro methane sulfonic acid, such as FC-520 (obtained from 3M Company), and organophosphonium halides. Phenolic compounds such as p-chlorophenol, 4,4'-dihydroxydiphenyl sulfone, bisphenol A, and tetrachlorobisphenol A may also be used.

In some cases accelerators may be used without typical epoxide curing agents such as diamines or anhydrides. Such curing agents are, for example the $BF_3$.monoethylamine complex.

The accelerators are typically used in amounts of from 0.1 to about 3.0 percent based on the total weight of the epoxy component of the composition.

The structural fibers which are useful in this invention include carbon, graphite, glass, silicon carbide, poly(benzothiazole), poly(benzimidazole), poly(benzoxazole), alumina, titania, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E. I. duPont de Nemours, Inc., Wilmington, Del.), and silicon carbide fibers.

The composition of this invention contains from about 30 to about 98, preferably from about 35 to about 90 percent by weight of the cycloaliphatic epoxy resin (component(a)) and from about 2 to about 98, preferably from about 5 to about 85 percent by weight of the adduct of the epoxy resin and aromatic active hydrogen containing compound (component(b)). If used, the epoxy curing agent may comprise between 2 and about 70 percent by weight of the total composition. The thermoplastic polymer may be used in amounts of up to 20 percent by weight of the total composition. The structural fiber may be used in amounts of up to about 85, preferably from about 20 to about 80 percent by weight of the total composite.

Preimpregnated reinforcement may be made from the compositions of this invention by combining the epoxy resin (i.e., components a and b), hardener, and optionally thermoplastic polymer with the structural fiber.

Preimpregnated reinforcement may be prepared by several techniques known in the art, such as wet winding or hot, melt In the hot melt process partially advanced resin mixtures are coated as a thin film onto a silicone coated release paper. Prepreg is made by passing a ribbon of fiber through a prepreg machine between two layers of coated release paper, where under the action of heat and pressure, the resin mixture is transferred from the paper to the fibers. Prepreg made by this process is typically taken up on a spool. It is used within a few days or may be stored for months at 0° F.

During prepreg manufacture, the resin system "B-stages", or partially advances.

Composites may be prepared by curing preimpregnated reinforcement using heat and pressure. Vacuum bag/autoclave cures work well with these compositions. Laminates may also be prepared via wet layup followed by compression molding, resin transfer molding, or by resin injection, as described in European Patent Application 0019149 published Nov. 26, 1980. Typical cure temperatures are from about 100° F. to about 500° F., preferably from about 180° F. to about 450° F.

The compositions of this invention may be used for filament winding. In this composite fabrication process, continuous reinforcement in the form of tape or tow—either previously impregnated with resin or impregnated during winding—is placed over a rotating and removable form or mandrel in a previously determined pattern. Generally the shape is a surface of revolution and contains end closures. When the proper number of layers are applied, the wound form is cured in an oven or autoclave and the mandrel removed.

The compositions of this invention may be used as aircraft parts such as wing skins, wing-to-body fairings, floor panels, flaps, radomes; as automotive parts such as driveshafts, bumpers, and springs; and as pressure vessels, tanks and pipes. They are also suitable for sporting goods applications such as golf shafts, tennis rackets, and fishing rods.

In addition to structural fibers, the composition may also contain particulate fillers such as talc, mica, calcium carbonate, aluminum trihydrate, glass microballoons, phenolic thermospheres, and carbon black. Up to half of the weight structural fibers in the composition may be replaced by filler. Thixotropic agents such as fumed silica may also be used.

Further, the compositions may be used in adhesives, potting and encapsulation, and coating applications.

EXAMPLES

The following examples serve to give specific illustrations of the practice of this invention but they are not intended in any way to limit the scope of this invention.

Epoxy equivalent weights (EEW) were measured by two methods. In the first, samples were dissolved in a 50/50 (volume) chlorobenzene/acetic acid solution and titrated with a solution of hydrogen bromide in acetic acid. In the second method, samples were dissolved in a 0.2 M solution of tetraethylammonium bromide in a 56/44 (volume) chlorobenzene/acetic acid solution and titrated with 0.1 N perchloric acid in acetic acid using crystal violet as an end point indicator.

Examples 1 through 6 describe the preparation of compositions of this invention. Control A describes the preparation of a similar resin made with an aliphatic polyol.

Example 1

A two-liter, 3-necked flask equipped with a paddle stirrer, thermometer with Therm-O-Watch controller, nitrogen inlet and outlet and an electric heating mantle was charged with 700 g of molten bis(2,3-epoxycyclopentyl) ether and 165 g of hydroquinone. The mixture was heated to a temperature of 80° C. After 11.5 ml of N,N-dimethylbenzylamine was added, the mixture was heated to 125° C. and held at that temperature for two hours. It was then cooled to a temperature of 115° C. and maintained at that temperature for an additional hour. After the mixture was diluted with 5 kg of methylene chloride, it was washed with 3 liters of dilute aqueous sodium chloride solution in a Morton flask. The clear bottom layer was separated and washed two more times with 3 liter portions of distilled water. The washed solution was fed to a 3-liter, 3-necked flask equipped with a paddle stirrer and a water-cooled distillation head. Methylene chloride was distilled from the mixture—first at atmospheric pressure for six hours, and then under vacuum (27 inches of mercury) for 2.5 hours. During distillation the flask was in an oil bath at a temperature of 85° C. The final pot residue contained oligomers of hydroquinone and bis(2,3-epoxycyclopentyl) ether as well as unreacted bis(2,3-epoxycyclopentyl) ether. It had an epoxy equivalent weight of 171 g/mole. Its viscosity was 39,000 centipoise at 50° C. Gas chromatographic analysis indicated that the product contained 37 percent by weight of bis(2,3-epoxycyclopentyl) ether. The yield was 630 g.

Example 2

A two-liter, 3-necked flask equipped as in Example 1 was charged with 900 g of molten bis(2,3-epoxycyclopentyl) ether and 212 g of resorcinol. The mixture was heated to a temperature of 80° C. and 14.7 ml of N,N- dimethylbenzylamine was added. The temperature of the mixture was raised to 125°–128° C. It was maintained at that temperature for 7 hours. Then it was cooled to a temperature of 105° C. and poured into 4000 g of methylene chloride in a Morton flask equipped with a paddle stirrer. The solution was washed five times with 3 liter portions of distilled water and then stripped of methylene chloride as in Example 1. The product (i.e., the pot residue) weighed 971 g and had an epoxy equivalent weight of 206 g/mole. Its viscosity was 100000 centipoises at 65° C. The bis(2,3-epoxycyclopentyl) ether content of the resin was 24 percent by weight.

Example 3

A 3-liter, 4-necked flask equipped as in Example 1 was charged with 1656 g of molten bis(2,3-epoxycyclopentyl) ether and 198 g of resorcinol. The mixture was heated to a temperature of 91° C. and then treated with 15 ml of N,N-dimethylbenzylamine. During the next 25 minutes, the mixture was gradually heated to a temperature of 135° C. It was maintained at that temperature for 4.5 hours, treated with an additional 10 ml of N,N-dimethylbenzylamine, and then heated for an additional 1.5 hours at 135° C. After the mixture was cooled to a temperature of 70° C., it was poured into a 12 l Morton flask containing 2 l of methylene chloride and washed twice with 3 l portions of distilled water. The washed organic layer was stripped of methylene chloride by distillation—first at atmospheric pressure to remove about 90 percent of the solvent, and then in a thin film evaporator operating at a temperature of 80° C. and 25 mm of mercury to remove the remainder. The final resin weighed 1854 g. Its epoxy equivalent weight was 126 g/mole, and its viscosity at 50° C. was 258 centipoises. The final resin contained approximately 49 percent by weight of unreacted bis(2,3-epoxycyclopentyl) ether and 51 percent oligomers formed from the reaction of resorcinol with bis(2,3-epoxycyclopentyl) ether.

Example 4

A 500 ml, 3-necked flask equipped as in Example 1 was charged with 150 g of molten bis(2,3-epoxycyclopentyl) ether, 49 g of 4,4'-biphenol, and 0.5 g of 2-ethyl-4-mehylimidazole. The mixture was heated for 6.5 hours at 130° to 145° C., followed by three hours at a temperature of 100° C. At the end of this period, it was transferred to a jar for storage. The final product weighed 174.5 g and had an epoxy equivalent weight of 192 g/mole. Its viscosity was 13,500 cps at 65° C. The bis(2,3-epoxycyclopentyl) ether content of the final resin was 38 percent by weight.

Control A

A two-liter flask equipped as in Example 1 was charged with 400 g of molten bis(2,3-epoxycyclopentyl) ether and 104 g of neopentyl glycol. The mixture was warmed to a temperature of 70° C. and treated with 2.0 ml of 1-methylimidazole. Then it was heated to a temperature of 135° C. and held at that temperature for 3.5 hours. Then it was cooled to a temperature of 110° C. and transferred to a 12 l flask containing 2000 g of methylene chloride. The resulting brown solution was washed five times with 2 l portions of distilled water. The washed solution was stripped of methylene chloride as described in Example 1. The product, the final pot residue, had an epoxy equivalent weight of 200 g/mole. It weighed 372 g and had a viscosity of 1,060 centipoises at 50° C. The bis(2,3-epoxycyclopentyl) ether content of this resin was 37 percent by weight.

Example 5

A 3-liter, 4-necked flask equipped as in Example 1 was charged with 995 g (5.40 moles) of bis(2,3-epoxycyclopentyl) ether and 275 g (2.5 moles) of resorcinol. The mixture was heated to a temperature of 100° C. Then 720 g (5.0 moles) of vinyl cyclohexene diepoxide (i.e., ERL-4206 from Union Carbide Corp.) was added over a 30 minute period. Forty minutes later, 2.67 ml of 1-methylimidazole was added. After an additional 3 hours at 100° C., the mixture was cooled to room temperature.

A 1050 g portion of the mixture was diluted with 500 g of methylene chloride and washed three times with 1000 ml portions of distilled water in a Morton flask equipped with a paddle stirrer. The washed organic phase was transferred to a 3-liter flask with a paddle stirrer and distillation head. Methylene chloride was distilled from the solution, first at atmospheric pressure, and then under a vacuum of approximately 28 inches of mercury for one hour with a pot temperature of 100° C. The product, the pot residue, was an amber fluid which weighed 809 g. It had an epoxy equivalent weight of 117 g/mole and contained approximately 45 percent by weight of unreacted his (2,3-epoxycyclopentyl) ether, 15 percent of unreacted vinyl cyclohexene diepoxide, and 40 percent of epoxy-containing adducts derived from resorcinol, vinyl cyclohexene diepoxide, and bis(2,3-epoxycyclopentyl)ether.

Example 6

A 3-liter, 4-necked flask equipped as in Example 1 was charged with 628 g of bis(2,3-epoxycyclopentyl) ether and 145 g of m-aminophenol. After the mixture reached a temperature of 70° C., it was treated with 288 g of vinyl cyclohexene diepoxide. The temperature of the mixture was raised to 100° C. Then 2.5 ml of N,N-dimethylbenzylamine was added. The mixture was heated for 2 hours at 100° C. and 5 hours at 120° C. before being cooled to 70° C. Then a 900 g portion was transferred to a 5-liter Morton flask containing 1500 ml of methylene chloride. The organic solution was washed with three 1000 ml portions of distilled water. The clear amber washed solution was stripped of residual methylene chloride by the procedure described in Example 3. The final product weighed 603 g and had a titrated epoxy equivalent weight of 161 g/mole, after correction was made for the nitrogen in m-aminophenol, which was titrated simultaneously with epoxy groups by the tetraethylammonium bromide/perchloric acid reagent mixture. The final resin was shown by size exclusion chromatography to contain 44 percent-by weight of unreacted bis(2,3-epoxycyclopentyl) ether, 6 percent of vinyl cyclohexene diepoxide, and 50 percent of oligomers derived from the reaction of m-aminophenol with bis(2,3-epoxycyclopentyl) ether and vinyl cyclohexene diepoxide. The viscosity of the final resin was 7600 centipoises at 50° C.

Examples 7 Through 11 and Control B

Unreinforced castings were prepared from the epoxy compositions described in Examples 1, 2, and 4 and Control A. Typical castings weighed 100 to 160 g and had dimensions of ⅛×8×5 to 8 inches.

All castings were cured with Tonox, a crude form of 4,4'-diaminodiphenyl methane (obtained from Uniroyal Chemicals, Naugatuck, Conn.) All epoxy formulations were adjusted to epoxy equivalent weights of 150 to 171 g/mole. For most samples, this was accomplished by addition of bis(2,3-epoxycyclopentyl) ether.

The general procedure for making castings was as follows: The epoxy resin and additional bis-(2,3-epoxycyclopentyl) ether needed to achieve an epoxy equivalent weight of 150 to 171 g/mole was charged to a 3-necked flask equipped with a paddle stirrer. The contents of the flask were heated to a temperature of 100° to 120° C. and stirred. The amine hardener was added to this solution as a fine solid. It dissolved in about two minutes. The resulting solution was subjected to a vacuum of about 25 inches of mercury for three minutes with agitation, followed by two minutes without agitation. It was then poured into a glass mold with a cavity of dimensions ⅛×8×8 inches, and cured with a programmed heating cycle.

Castings were tested to determine tensile properties, heat deflection temperature, and water sensitivity. For the latter, the change in weight on immersion of tensile bars in 160° F. water after two weeks was recorded. Tensile properties were measured according to ASTM D-638 using a Type 1 dogbone specimen. Heat deflection temperatures were measured according to ASTM D-648 (264 psi stress).

Table I lists the components of each resin formulation, cure schedules, and casting properties.

The data in Table I shows that the bis (2,3-epoxycyclopentyl) ether copolymers derived from aromatic diphenols (e.g., hydroquinone, resorcinol, and 4,4'-biphenol) afford unreinforced castings with superior heat deflection temperatures and reduced water uptake compared to copolymers derived from aliphatic polyols (e.g., neopentyl glycol).

Examples 11 Through 13 and Controls C Through E

A second series of unreinforced castings was prepared using the general procedure described above and m-phenylenediamine as the hardener. For each Example, a Control was prepared which had the same NH: epoxide stiochiometry. The resin and hardener were mixed at a temperature of 70° to 85° C. In each Example, the epoxy resin contained oligomers derived from aromatic active hydrogen compounds and cycloaliphatic epoxides (i.e. component b of the composition) as well as unreacted cycloaliphatic epoxide (component a). When two cycloaliphatic epoxides were present in the composition of the Example, the same ratio of unreacted cycloaliphatic epoxides was present in the corresponding Control (e.g. Control C for Example 11).

All unreinforced castings were cured with the following cure schedule: 5 hours at 85° C.; heat at 1° C. per minute to 120° C.; hold 4 hours at 120° C.; heat at 1° C. per minute to 160° C.; hold 6 hours at 160° C.

Example 13 describes an epoxy composition of this invention which was prepared by blending 80 g of bis (2,3-epoxycyclopentyl) ether with 40 g of "Fortifier C" (a product of Uniroyal Canada, Guelph, Ontario, Canada). The latter was a reaction product of aniline and vinyl cyclohexene diepoxide which contained 33 percent by weight of unreacted diepoxide, and 67 percent of a mixture of oligomers containing approximately 3 moles of diepoxide per mole of aniline. The epoxy equivalent weight of Fortifier C was 130 g/mol, after a correction was made for the nitrogen derived from aniline.

The tensile properties and heat deflection temperatures of this series of castings are shown in Table II. All compositions containing component b of this invention provide unreinforced castings with increased tensile moduli compared to the appropriate Control. The modulus is a bulk property of the material, unlike strength and elongation, which are sensitive to defects in the sample. Thus an increased matrix modulus should result in an increased composite modulus.

Example 14

Another unreinforced casting was prepared using 100 g of the composition of Example 3 and 23.6 of m-phenylenediamine using the procedures described for Examples 11 through 13. The properties of the casting were as follows: tensile strength: 16,700 psi: tensile modulus: 624,000 psi elongation: 3.9 percent and heat deflection temperature 174° C.

The viscosity of this epoxy/hardener mixture at 85° C. was measured. The data is shown in Table III along with data for a Control Resin with the same epoxy equivalent weight derived from an aliphatic polyol. These data show that the compositions of this invention cure more rapidly than those based on aliphatic polyols.

TABLE I

| CASTING EXAMPLE | 7 | 8 | 9 | 10 | Control B |
|---|---|---|---|---|---|
| Resin Formulation | | | | | |
| Bis(2,3-epoxycyclopentyl) Ether Copolymer | | | | | |
| Polyol | Hydroquinone | Resorcinol | Resorcinol | 4,4'-Biphenol | Neopentyl Glycol |
| Example | 1 | 2 | 2 | 4 | Control A |
| Wt (g) | 110 | 74.8 | 90 | 83 | 80 |
| Bis(2,3-epoxycyclopentyl) ether added (g) | 0 | 35.2 | 10.1 | 11.6 | 14.5 |
| Tonox (g) | 33.8 | 33.8 | 31.9 | 27.9 | 27.6 |
| Equivalent Wt of Epoxy Component (g/mole) | 171 | 150 | 171 | 171 | 171 |
| NH/Epoxide Stoichiometry[a] | 1.05 | 0.92 | 1.00 | 1.00 | 1.00 |
| Cure Schedule | 5 hr. @ 100° C. 3 hr. @ 130° C. 14 hr. @ 200° C. | 5 hr @ 100° C. 3 hr @ 130° C. 14 hr @ 200° C. | 15 hr @ 75° C. 2 hr @ 100° C. 3.5 hr @ 130° C. 1 hr @ 150° C. 14 hr @ 180° C. | 5.5 hr @ 100° C. 7 hr @ 130° C. 9 hr @ 160° C. | 5.5 hr @ 100° C. 7 hr @ 130° C. 9 hr @ 160° C. |
| Casting Properties | | | | | |
| Tensile Strength ($10^3$ psi) | 12.0 | 9.6 | 13.0 | 10.6 | 12.4 |
| Tensile Modulus ($10^3$ psi) | 616 | 619 | 551 | 506 | 750 |
| Elongation (%) | 3.0 | 1.7 | 2.9 | 2.9 | 1.9 |
| Heat Deflection Temp. (°C.) | 175 | 184 | 165 | 178 | 109 |
| Water Uptake (%)[b] | 6.0 | 5.6 | — | 5.5 | 8.9 |

[a]Equivalent wt of Tonox = 50 g/mole.
[b]After two weeks immersion at 160° F.

TABLE II

| CASTING EXAMPLE | 11 | Control C | 12 | Control D | 13 | Control E |
|---|---|---|---|---|---|---|
| Resin Formulation | | | | | | |
| Resin Example | 5 | — | 6 | — | — | — |
| Resin Components | | | | | | |
| Adduct, wt (g) | 47 | — | 55 | — | 27.7[b] | — |
| Bis(2,3-epoxycyclopentyl) ether, wt (g) | 53 | 69 | 48.4 | 88 | 80 | 100 |
| Vinyl cyclohexene diepoxide wt (g) | 17 | 23 | 6.6 | 12 | 13.3[b] | 16.6 |
| Total resin wt[c] (g) | 117 | 92 | 110 | 100 | 120 | 116.5 |
| MPDA wt[a] (g) | 30 | 31.8 | 20.2 | 33.3 | 33.6 | 37.4 |
| Bis(2,3-epoxycyclopentyl) ether/vinyl cyclohexene diepoxide wt ratio | 3.1 | 3.0 | 7.3 | 7.3 | 6.0 | 6.0 |
| NH/Epoxide Stoichiometry | 1.10 | 1.10 | 1.10 | 1.10 | 1.05 | 1.05 |
| CASTING PROPERTIES | | | | | | |
| Tensile strength (10³ psi) | 15.1 | 17.6 | 12.4 | 17.1 | 14.3 | 16.2 |
| Tensile Modulus (10³ psi) | 873 | 699 | 712 | 669 | 730 | 708 |
| Elongation (%) | 2.0 | 3.3 | 1.9 | 3.4 | 2.2 | 2.9 |
| Heat Deflection Temp (°C.) | 145 | 186 | 171 | 189 | 178 | 187 |

[a]m-phenylenediamine
[b]Fortifier C from Uniroyal Canada
[c]Total resins wt = (Adduct wt + Bis(2,3-epoxycyclopentyl) ether wt. + Vinyl cyclohexene diepoxide wt)

TABLE III

Viscosities of Epoxy Resin/m-Phenylenediamine Mixtures at 85° C.[a]

| Resin from Example 3 | Viscosity (cps) | 42 | 85 | 300 | 8,100 | |
| | time (min) | 0 | 30 | 60 | 100 | |
| Resin from Control A[b] | Viscosity (cps) | 15 | 16 | 20 | 32 | 500 |
| | time (min) | 0 | 30 | 60 | 100 | 200 |

[a]NH/Epoxide stoichiometry = 110%. Viscosities measured in a Brookfield Thermosel Viscometer (from Brookfield Engineering Laboratories. Stoughton, MA). EEW of epoxy component = 126 g/mol
[b]10.0 g of Resin in Control A (EEW = 171)
10.0 g of bis(2,3-epoxycyclopentyl)ether (EEW = 92)
4.72 g of m-phenylenediamine Example 15 describes the preparation of unidirectional carbon fiber prepreg. The carbon fiber was based on polyacrylonitrile. It contained 6000 filaments per tow. The filament tensile strength was $6.6 \times 10^5$ psi and the tensile modulus was $36 \times 10^6$ psi. Prepreg with a nominal width of 6 inches and a nominal thickness of 6 mils was prepared.

Example 15

A 3 liter, 4-necked flask equipped as in Example 1 was charged with 900 g of the epoxy resin prepared in Example 3. The contents of the flask were heated to a temperature of 85° C. Then 212 g of m-phenylenediamine was added over a 15 minute period. The mixture was maintained at a temperature of 82° to 92° C. for 1 hour after completion of addition the hardener in order to partially advance it. This B-staged resin was poured into the pan of a knife-over-roll coater at a temperature of 80° C. and coated in a seven inch width at a coating weight of 4.0 g/sq ft.

Preimpregnated tape was prepared by sandwiching a six inch wide ribbon of carbon fiber tows between two plies of release paper and melting the resin into the fibers under the action of heat and pressure in a prepreg machine. The resin content of the final tape was 37 percent by weight.

Example 16 describes the fabrication and testing of a unidirectional composite for longitudinal tensile properties.

Example 16

A unidirectional laminate was prepared by stacking 8 plies of the preimpregnated tape made in Example 15 in a mold, covering them with a teflon impregnated fabric spacer and bleeder cloths, and enclosing them in a nylon bag. The entire assembly was placed in an autoclave and cured. Longitudinal tensile properties were measured at ambient temperature according to ASTM-D3039. The results and cure schedule are shown in Table IV.

Example 17 describes the fabrication and testing of a unidirectional composite for transverse tensile properties.

Example 17

A unidirectional laminate was prepared by stacking 20 plies of 6-inch wide tape in a mold and curing it in an autoclave.

Transverse tensile specimens were prepared from the cured laminate and were tested according to ASTM-D3039. The results and cure schedule are shown in Table IV.

TABLE IV

| COMPOSITE PROPERTIES[a] | |
|---|---|
| Longitudinal | |
| Layup Example | 16 |
| Tensile Strength (10³ psi) | 355 |
| Tensile Modulus (10⁶ psi) | 20.6 |
| Strain-to-Failure (%) | 1.54 |
| Fiber Content (vol %) | 61.2 |
| Transverse | |
| Layup Example | 17 |
| Tensile Strength (10³ psi) | 10.5 |
| Tensile Modulus (10⁶ psi) | 1.56 |
| Strain-to-Failure (%) | 0.71 |
| Fiber Content (vol %) | 59 |

Cure Schedule:
Apply vacuum to bag. Pressurize autoclave to 85 psi. Heat from 70° F. to 240° F. at 3° F./min. Hold 1 hour at 240° F. Then, vent bag to the atmosphere and increase autoclave pressure to 100 psi. Heat from 240° F. to 350° F. at 3° F./min. Hold at 350° F. for 6 hours.

It is clear that the compositions of this invention provide composites with a high level of mechanical properties. The high transverse modulus reflects the high matrix modulus. The transverse strength and strain to failure are superior to those measured on composites made with state of the art matrix resins.

What is claimed:

1. A resinous composition comprising:
   (a) a cycloaliphatic epoxy resin selected from bis(2,3-epoxycyclopentyl)ether, 4-(1,2-epoxyethyl)-1,2-epoxycyclohexane, 3,4-epoxycyclohexylmethyl 3,4-epoxycyclohexane carboxylate, 2-(3,4-epoxycyclohexyl-5,5-spiro 3,4-epoxy)cyclohexane meta-dioxane, bis(3,4-epoxycyclohexyl) ether, 1,4-cyclohexadiene diepoxide, a diepoxide of vinyl cyclopentenyl ether, a diepoxide of allyl cyclopentenyl ether, or mixtures thereof, and
   (b) an adduct of an epoxy resin of (a) with an aromatic active hydrogen containing compound selected from:

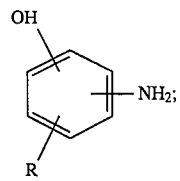 (i)

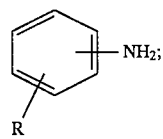

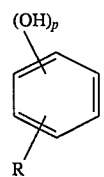

wherein R is H or lower alkyl, p is an integer of 2 or 3; and/or

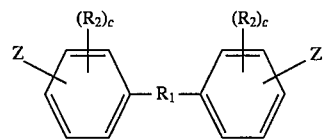 (ii)

wherein $R_1$ is a direct bond, O, $SO_2$, S, SO, alkylidene of 1 to 6 carbon atoms, $R_2$ is independently hydrogen, halogen, lower alkyl of 1 to 4 carbon atoms, c is an integer of 0 to 4, Z is OH or $NHR_3$ and $R_3$ is hydrogen or lower alkyl of 1 to 4 carbon, atoms and wherein the total epoxy equivalent weight of the composition is between about 60 and about 250 grams/mole.

2. A composition as defined in claim 1 wherein the epoxy resin is selected from bis(2,3-epoxycyclopentyl) ether, 4-(1,2-epoxyethyl)-1,2-epoxycyclohexane, 3,4-epoxycyclohexylmethyl 3,4-epoxycyclohexane carboxylate, 1,4-cyclohexadiene diepoxide, 2-(3,4-epoxycyclohexyl-5,5-spiro-3,4-epoxy) cyclohexane meta-dioxane, or mixtures thereof.

3. The composition of claim 1 wherein said active hydrogen-containing aromatic compound is selected from the group consisting of hydroquinone, resorcinol, 4,4'-biphenol, aminophenol and aniline.

4. The composition of claim 1 wherein said epoxy resin of components (a) and (b) is bis(2,3-epoxycyclopentyl) ether, and said active hydrogen-containing aromatic compound is selected from the group consisting of hydroquinone, resorcinol, 4,4'-biphenol, aminophenol and aniline.

5. An epoxy composition having a total epoxy equivalent weight of between 60 and 250 g per mole, said composition comprising:
   (a) from 30 to 98 wt % of bis(2,3-epoxycyclopentyl) ether;
   (b) from 2 to about 98 wt % of an epoxy resin adduct, said adduct consisting of the reaction product of bis(2,3-epoxycyclopentyl) ether with an active hydrogen-containing aromatic compound selected from the group consisting of hydroquinone, resorcinol, 4,4'-biphenol, aminophenol, aniline and mixtures thereof;
   (c) from 2 to 70 wt % of an epoxy curing agent;
   (d) up to 20 wt % of a thermoplastic polymer; and
   (e) up to 85 wt % of a structural fiber.

6. In a composition comprising from 30 to 98 wt % of a cycloaliphatic epoxy resin, from 2 to 70 wt % of an epoxy curing agent, up to 20 wt % of a thermoplastic polymer and up to 85 wt % of a structural fiber, the improvement wherein:

said composition has a total epoxy equivalent weight of between 60 and 250 g per mole; and said composition further comprises from 2 to about 98 wt % of an epoxy resin adduct, said adduct consisting of the reaction product of a cycloaliphatic epoxy resin with an active hydrogen-containing aromatic compound selected from the group consisting of dihydric phenols, aminophenols, aniline and mixtures thereof.

7. The composition of claim 6 wherein said cycloaliphatic epoxy resin is selected from the group consisting of bis(2,3-epoxycyclopentyl) ether, 4-(1,2-epoxyethyl)-1,2-epoxycyclohexane, 3,4-epoxycyclohexylmethyl 3,4-epoxycyclohexane carboxylate, 1,4-cyclohexadiene diepoxide, 2-(3,4-epoxycyclohexyl-5,5-spiro-3,4-epoxy) cyclohexane meta-dioxane, bis(3,4-epoxycyclohexyl) ether, a diepoxide of vinyl cyclopentenyl ether, a diepoxide of allyl cyclopentenyl ether, and mixtures thereof.

8. The composition of claim 6 wherein said active hydrogen-containing aromatic compound is selected from the group consisting of hydroquinone, resorcinol, 4,4'-biphenol, aminophenol and aniline.

9. The composition of claim 6 wherein said active hydrogen-containing aromatic compound is resorcinol.

10. The composition of claim 6 wherein said active hydrogen-containing aromatic compound is hydroquinone.

* * * * *